United States Patent
von Gutfeld et al.

(10) Patent No.: US 6,509,947 B2
(45) Date of Patent: Jan. 21, 2003

(54) METHOD AND DEVICE FOR ELIMINATING BUBBLE FORMATION WITHIN A LIQUID CRYSTAL DISPLAY

(75) Inventors: Robert Jacob von Gutfeld, New York, NY (US); James Henry Glownia, Somers, NY (US); Richard Allen John, Yorktown Heights, NY (US); Shui-Chih Alan Lien, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 09/740,715

(22) Filed: Dec. 19, 2000

(65) Prior Publication Data

US 2002/0075444 A1 Jun. 20, 2002

(51) Int. Cl.[7] ............................................. G02F 1/1335
(52) U.S. Cl. ...................................................... 349/153
(58) Field of Search ........................................ 349/153

(56) References Cited

U.S. PATENT DOCUMENTS

| | | | | |
|---|---|---|---|---|
| 4,545,650 A | * | 10/1985 | Kirkman et al. | 349/153 |
| 4,682,858 A | * | 7/1987 | Kanbe et al. | 349/153 |
| 4,832,460 A | * | 5/1989 | Fujimura et al. | 349/153 |
| 5,263,888 A | | 11/1993 | Ishihara et al. | 445/25 |
| 5,953,087 A | * | 9/1999 | Hoyt | 349/153 |

* cited by examiner

Primary Examiner—James Dudek
(74) Attorney, Agent, or Firm—Marian Underweiser; Gary M. Hartman; Domenica N. S. Hartman

(57) ABSTRACT

A device and method for maintaining the volume of a liquid contained within a cavity between two substrates to something equal or nearly equal to that of the volume of the cavity. A particular application is a liquid crystal display (LCD), in which a liquid crystal (LC) material is contained within a cavity between two flat display substrates. The device serves to minimize the volume differential between the liquid and the cavity caused by a change in temperature of the display, such that the formation of bubbles within the liquid is substantially or completely prevented. In so doing, the device essentially eliminates thermally-induced defects that would otherwise be visible to the user.

18 Claims, 2 Drawing Sheets

METHOD AND DEVICE FOR ELIMINATING BUBBLE FORMATION WITHIN A LIQUID CRYSTAL DISPLAY

BACKGROUND OF THE INVENTION

1. Field of the Invention

The present invention generally relates to structures in which a volume between two substrates forming a panel is filled with a liquid. More particularly, this invention relates to liquid crystal displays of the type used with computer equipment, and provides a method and device for maintaining a desired level of liquid crystal material between two substrates forming a display panel so that bubble formation does not occur as a result of changes in volume of the liquid and/or the cavity between the substrates, as would occur as a result of temperature fluctuations.

2. Description of the Prior Art

Liquid crystal display (LCD) panels are made in a variety of ways, including flat panel displays used in portable computers. Flat panel displays typically comprise two flat substrates spaced apart to define a cavity therebetween in which a liquid crystal (LC) material is contained. Stringent requirements must generally be placed on the quality of displays used in the computer industry in order to find acceptance in the marketplace. For example, small defects in an LCD can visually be very disturbing and easily detected by the viewer. One known problem with flat panel displays is associated with temperature fluctuations, which can be quite considerable. For example, a computer and its flat panel display may be stored at temperatures well below −20° C., then utilized in an environment where the display may operate at a temperature of 40° C. or more. With such fluctuations, the LC material and the cavity in which the LC material is contained will expand and contract. Because liquid display materials have a greater coefficient of thermal expansion than the substrates of the display, the excessive contraction of the LC material relative to its cavity can have the effect of creating vacuum spaces or bubbles in the LC material. If there is undue expansion, the problem is less severe though excessive volume expansion of the LC material may damage the cavity or cause poor definition due to the ensuing incomplete polarization of the panel light upon switching of individual pixels.

The expansion/contraction problem is especially likely to occur with the so-called one drop fill (ODF) method of the type disclosed in U.S. Pat. No. 5,263,888 to Ishihara et al., in which relatively rigid spacers are used to separate two flat substrates. Such spacers cannot be readily compressed to allow the substrates to move toward each other, which would decrease the volume of the cavity containing the LC liquid to compensate for a decrease in the volume of the LC material as a result of a temperature drop.

From the above, it can be seen that it would be desirable to provide a solution to the problem of visual defects that occur in a LCD flat panel display as a result of fluctuations in the temperature of the display.

BRIEF SUMMARY OF THE INVENTION

The present invention provides a device and method for maintaining the volume of a liquid contained within a cavity between two substrates to something equal or nearly equal to that of the volume of the cavity. In this manner, the formation of voids or bubbles within the liquid is substantially or completely eliminated or minimized. If the liquid is a liquid crystal (LC) material between two flat display substrates, the invention essentially eliminates thermally-induced defects that would otherwise be visible to the user.

The present invention generally provides means for minimizing the volume differential between an LC material and a display panel cavity in which the LC material is contained. One approach provided by the invention is to deliver additional LC material to the cavity and receive LC material from the cavity as required in response to changes in temperature. For this purpose, a reservoir is provided from which the LC material is dispensed and accumulated as required to compensate for the differential volume expansion of the LC material and display cavity. Means are preferably provided for reducing the volume of the reservoir in response to a temperature drop, thus forcing some of the LC material within the reservoir into the panel cavity to compensate for the contraction of the LC material within the cavity that occurred as a result of the temperature drop. Similarly, if there is an expansion of the LC material within the panel cavity, the means associated with the reservoir allows the excess volume of LC material to flow from the panel cavity into the reservoir. Another approach of the invention is to provide a panel cavity with a controllable variable volume. With either embodiment, though the ambient temperature of the display fluctuates, the panel cavity remains substantially filled with the LC material, so that voids and bubbles are avoided.

Other objects and advantages of this invention will be better appreciated from the following detailed description.

DETAILED DESCRIPTION OF THE INVENTION

Figure 5:
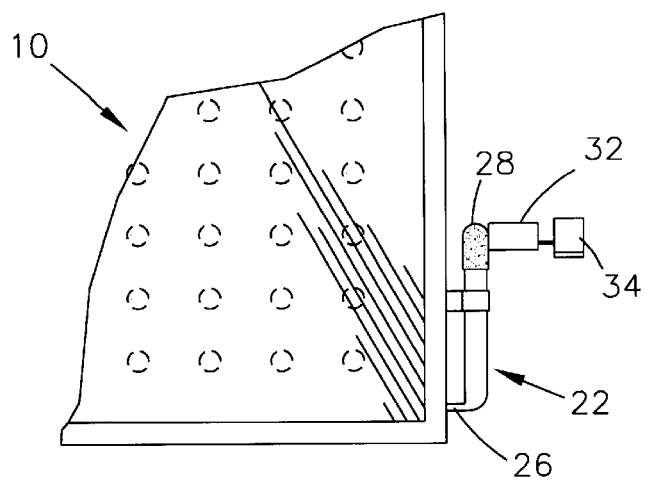
FIGS. 5 and 6 schematically represent reservoirs for containing, dispensing and accumulating an LC material in accordance with two additional embodiments of this invention.
Figure 6:
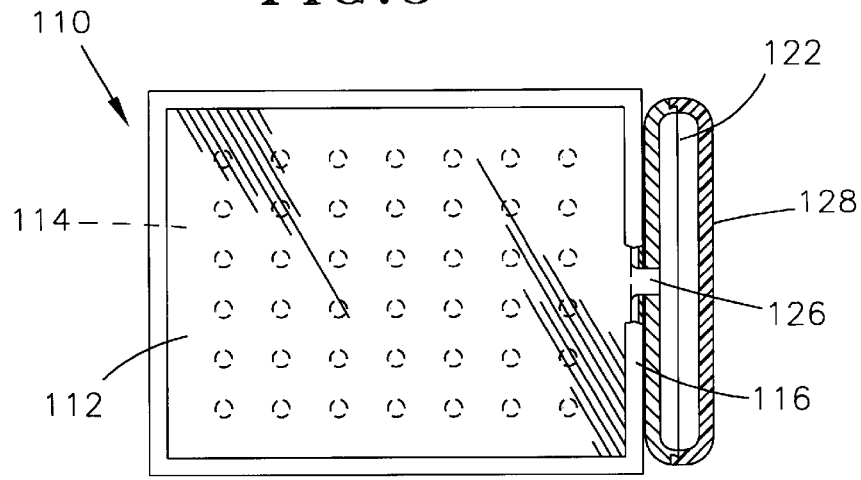
Figure 7:
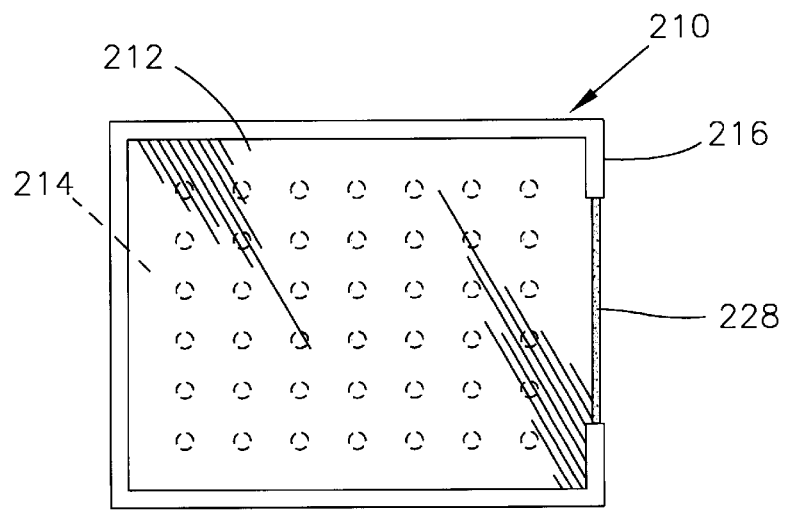
FIG. 7 schematically represents the interior of a flat panel display in accordance with a fourth embodiment of this invention.

FIGS. 1 through 7 show various embodiments of this invention for maintaining a desired fill level for an LCD material contained within a flat panel LCD of a type known in the art, such as flat panel LCD's used as the displays for portable computers, TV monitors, desktop computer displays, cellular phones, personal digital assistants (PDA's), global positioning systems (GPS) and avionics. In the three embodiments represented by FIGS. 1 through 6, the flat panel display is equipped with a small reservoir containing LC material that can be delivered to or received from the display, according to the temperature of the display. In contrast, the embodiment of FIG. 7 provides an LCD whose internal cavity has a controllable variable volume. While schematically represented and described in reference to LCD's for computer displays, those skilled in the art will recognize that the advantages of this invention can be applied to a variety of other applications.

Figure 1:
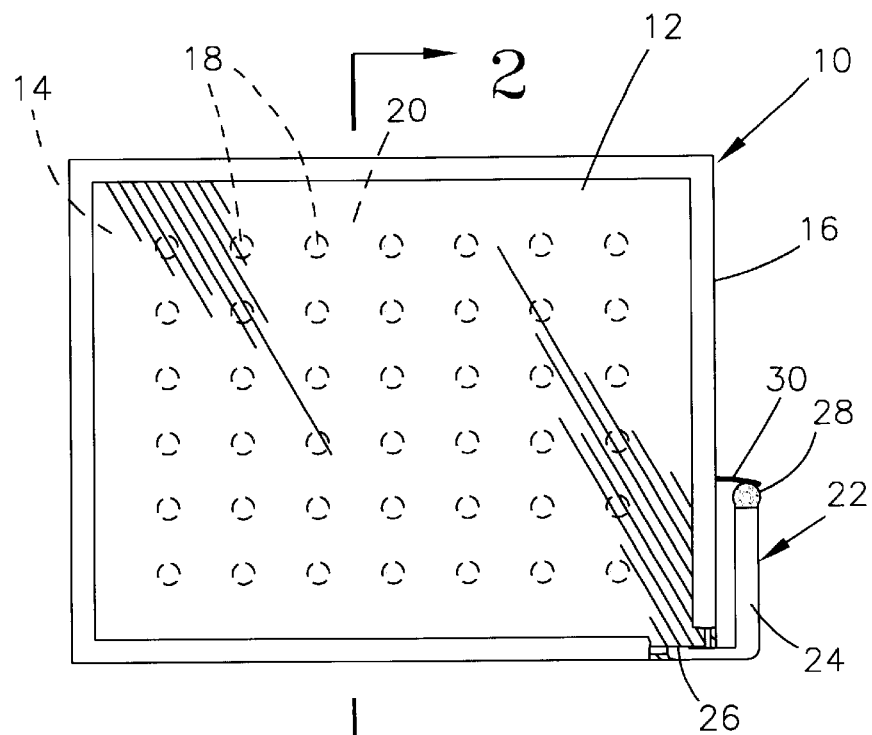
FIG. 1 schematically represents the interior of a flat panel display equipped with a reservoir containing an LC material in accordance with a first embodiment of this invention.
Figure 2:
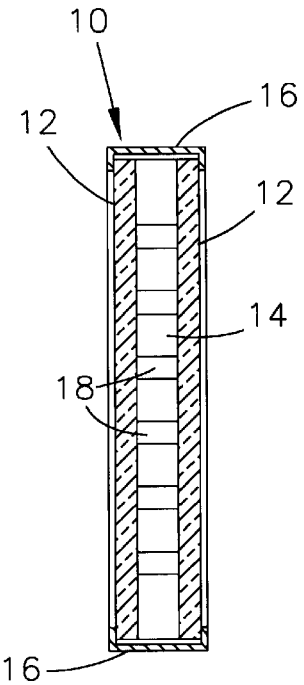
FIG. 2 is a cross-sectional view of the flat panel display of FIG. 1.

In the embodiment of FIGS. 1 and 2, a flat panel display 10 is represented as being composed of two flat substrates 12 that define a cavity 14 therebetween. The cavity 14 is filled with an LC material 20 of any suitable type known in the art, such as a fluorinated liquid crystal available under the name ZL15080 from Merck & Co., Inc. The substrates 12 can be formed of a variety of materials, typical examples of which include glass materials such as 1737 from Dow Corning. The substrates 12 are spaced apart along their perimeters by edge members 16 and within their interiors by a number of rigid spacers 18. The edge members 16 enclose the cavity 14 along the perimeters of the substrates 12, and therefore are formed of a suitable structural material that is compatible with the LC material 20. The spacers 18 contact both of the substrates 12. As known in the art, the spacers 18 are distributed within the cavity 14 to maintain a fixed spacing between the substrates 12. For this reason, the spacers 18 are typically formed of a relatively rigid polymeric material, such as a polyimide, though other materials could be used. The manufacture and assembly of the display 10, including its materials and the manner in which the cavity 14 is filled with the LC material 20, are known to those skilled in the art, and therefore will not be discussed in any detail here.

Figure 3:
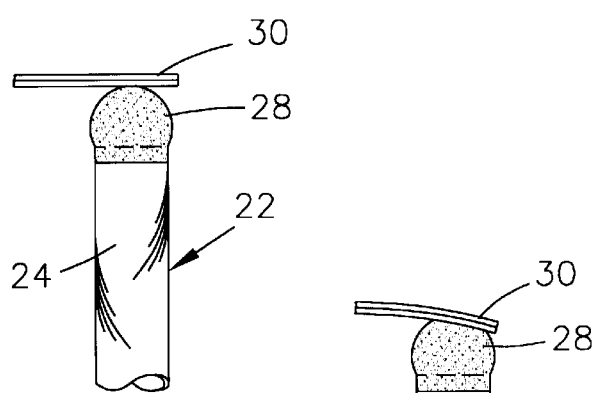
FIGS. 3 and 4 show the operation of the reservoir of FIG. 1 in response to temperature fluctuations.
Figure 4:
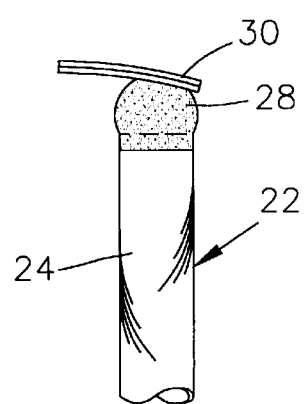

As shown in FIG. 1, the display 10 includes a reservoir in the form of a thin tube 22 mounted to one side of the substrates 12. The tube 22 is shown as being an integral portion of the side member 16, though it is foreseeable that the tube 22 could also be formed as a discrete component that is mounted to the display 10. The tube 22 contains an LC material 24, preferably identical to the LC material 20 within the panel cavity 14. Consequently, suitable materials for the tube 22 include the same materials used to form the edge members 16 of the display 10, though other materials could foreseeably be used. The LC material 14 within tube 22 directly communicates with the LC material 20 within the panel cavity 14 through a small passage 26, shown as being located at the bottom of the display 10 and tube 22, though other locations are possible. The tube 22 is equipped with a small diaphragm 28 formed of a compliant material and located near the top of the tube 22. The diaphragm 28 may be in the form of a cap to the tube 22, as generally represented in FIGS. 3 and 4. Suitable materials for the diaphragm 28 include rubber or another thin flexible material, such as an elastomer sheet material. According to the invention, the diaphragm 28 is caused to deflect inward into the tube 22 (and allowed to move outward away from the tube 22) by way of a contact actuator that is responsive to temperature changes, such as a bimorph spring 30 shown in FIGS. 3 and 4. A suitable spring 30 is formed of two strips of different materials, which are swaged, welded or otherwise joined together. The strip materials are chosen to have different coefficients of thermal expansion so that a sufficient change in temperature will cause the spring 30 to deflect. Suitable material combinations are well known in the art, and include strips of tungsten and copper, copper and tin, and iron and aluminum. In FIG. 3, the spring 30 is at a null position corresponding to a temperature at which compensation is not required for the thermal contraction of the volume of LC material 20 within the cavity 14. The situation depicted in FIG. 3 may correspond to the highest ambient temperature intended for the display 10, in which case the LC material 20 has expanded to its maximum volume within the cavity 14. In contrast, FIG. 4 shows the diaphragm 28 deflected into the tube 22 by the spring 30 in response to a temperature drop, causing a portion of the LC material 24 within the tube 22 to be forced into the panel cavity 14. By appropriately sizing the tube 22, the degree to which the spring 30 deflects with respect to temperature can be calibrated to dispense an amount of LC material 24 from the tube 22 so that the volume of LC material 20 within the cavity 14 remains essentially constant over a suitable range of temperatures, e.g., about −20° C. to about 70° C., with the result that the formation of voids or bubbles within the LC material 24 is eliminated or at least minimized. On the other hand, if the LC material 20 within the cavity 14 expands as a result of a temperature rise, the pressure applied by the spring 30 on the diaphragm 28 would be reduced or completely eliminated as a result of the spring 30 deflecting away from the diaphragm 28, allowing the extra volume of LC material 20 from the cavity 20 to flow into the tube 22 via the passage 26.

FIG. 5 shows a spring or hydraulic actuator 32 as an alternative type of device for operating the diaphragm 28 of FIG. 1. The actuator 32 may be controlled by a computer (not shown) to which the display 10 is connected, in response to a signal generated by a temperature sensor 34. Other possible actuators include piezoelectric elements, springs and other temperature-sensitive biasing elements known in the art.

FIGS. 6 and 7 illustrate further embodiments for achieving the temperature compensation effect of this invention. In FIG. 6, an LC display 110 includes a reservoir in the form of a thin channel 122 located along one side of the display 110. The channel 122 is fluidically connected by a passage 126 to a panel cavity 114 defined within the LC display 110 by two glass substrates 112. The passage 126 is shown as being located midway up the edge member 116, though the passage 126 could be located elsewhere on the display 110, including the lower corner of the display 110 as done with the embodiment of FIGS. 1 and 5. The channel 122 is shown as being defined within a discrete component that is attached to a side member 116 of the display 110. At least a portion of the outer containment wall 128 of the channel 122 is formed of a flexible material, allowing the wall 128 to serve as a diaphragm that can deflect inward and outward relative to the channel 122 to maintain a substantially constant volume of LC material within the cavity 114 over a desired temperature range. Finally, FIG. 7 represents an LC display 210 having one edge member 216 equipped with a flexible diaphragm or wall portion 228. In contrast to the previous embodiments, the panel cavity 214 of FIG. 7 has a variable volume that is controlled with the wall portion 228 to substantially coincide with the volume of LC material within the cavity 214. The wall 128 and wall portion 228 of FIGS. 6 and 7 may be deflected with any of the contact actuators 30 and 32 shown in FIGS. 1, 3, 4 and 5, as well as any other suitable type of device or effect. For example, it may be possible for the wall 128 or wall portion 228 to be sufficiently flexible to sense a volume change within its cavity 114 or 214 and compensate for such a change by means of atmospheric pressure exerted on the wall 128 or wall portion 228, in which case a discrete actuating device would not be required.

By compensating for the loss of volume of LC material within an LCD panel cavity as a result of thermal contraction, the present invention prevents or at least minimizes the formation of voids or bubbles within the LC material that would otherwise occur if the material has a coefficient of thermal expansion that is sufficiently higher than the materials from which the LCD substrates, edges and spacers (e.g., 12, 16 and 18, respectively, of FIGS. 1 and 2) are formed, and the display is subject to sufficiently great temperature variations. The volume of LC material that must be dispensed from the tubes 22 or channel 122 of FIGS. 1, 5 or 6 to compensate for a differential volume of the corresponding LC material and panel cavity is relatively small. The total LC content of a flat display panel is typically less than one milliliter, such that only a fraction of one milliliter is required to be contained within the tube 22 or channel 122 to compensate for fluctuations in the amount of the LC material within the cavity 14 or 114. As a result, a practical size for the tubes 22 and channel 122 is an inner diameter of about one millimeter and a length of about fifty millimeters, with lesser and greater lengths being foreseeable.

While various other factors may be involved, the difference in thermal expansion between the LC material 20 and the spacers 18 is likely to be the primary factor in the formation of voids and bubbles within the LC material 20 during fluctuations in temperature. The effective volume of the cavity 14 at a temperature "T" may be denoted as V(T), based on:

$$V(T)=A(T)\times H(T)$$

where A(T) is the effective surface area of one of the substrates 12 within the cavity 14 at temperature T excluding the cumulative area of the spacers 18, and H(T) is the height of the spacers 18 at temperature T. Changes in temperature will cause variations in H(T) and in A(T) as follows:

$$H(T)=H_0(1+\alpha_1 \Delta T)$$

and $$A(T)=L_0(1+\alpha_2 \Delta T)\times W_0(1+\alpha_2 \Delta T)$$

where $H_0$ is the height of the spacers 18 and $L_0$ and $W_0$ are the length and width, respectively, of the cavity 14, with all subscript parameters taken at a particular reference temperature, generally the temperature during filling of the cavity 14. $\alpha_1$ is the linear thermal coefficient of expansion of the spacers 18, $\alpha_2$ is the linear coefficient of thermal expansion of the substrates 12 (e.g., glass), and $\Delta T$ is the temperature difference between the liquid crystal fill temperature and the ambient temperature in question. There may be cases where $\alpha_1$ is approximately equal to $\alpha_2$, such as when the materials for the spacers 18 and the substrates 12 are the same.

Bubbles will form when the volume V(T) of the cavity 14 is sufficiently greater than the volume of LC material 20 within the cavity 14. The volume of the LC material 20 is designated as W(T), and is temperature dependent based on a thermal coefficient of volume expansion, $\beta$. The volume W(T) of the LC material can be expressed as $$W(T)=W_0(1+\beta \Delta T)$$

Unless compensated for, bubbles form within the LC material 20 when a temperature change ($\Delta T$) occurs such that the volume V(T) is greater than W(T). Accordingly, the present invention specifically compensates for the volume differential, $V(T)-W(T)=\Delta V$ to eliminate bubble formation.

An example follows using typical panel (cavity) dimensions, the following thermal expansion coefficients, and assuming a temperature drop ($\Delta T$) of 40° C. from the original temperature at which the cavity 14 was filled.
$\alpha_1$ (polymer)=$20\times 10^{-6}$/°C. (linear coefficient)
$\alpha_2$ (glass)=$7.6\times 10^{-6}$/°C. (linear coefficient)
$\beta_1$ (LC material)=$670\times 10^{-6}$/°C. (volume coefficient)
$L_0$=25.4 cm
$W_0$=20.3 cm
$H_0$=5 $\mu$m Using the above values, the shrinkage in volume of the LC material 20 as compared to the volume of the cavity 14 is calculated to be about $7.2\times 10^{-3}$ cm$^3$. While this volume differential ($\Delta V$) may appear to be inconsequential, bubbles that can develop in the LC material 20 are often on the order of about $4\times 10^{-6}$ cm$^3$. As a result, as many as two thousand bubbles may form from a temperature drop of 40° C., which is sufficient to cause major viewing or visual defects in the LC display 10. Though differing in certain respects, each of the embodiments of this invention is adapted to compensate for smaller and larger volume differentials, for the purpose of preventing the formation of bubbles over the entire operating temperature range of the display 10.

While the invention has been described in terms of particular embodiments, it is apparent that other forms could be adopted by one skilled in the art. For example, appropriate materials could be substituted for those noted, or various types of actuating devices could be substituted for those disclosed. Accordingly, the scope of the invention is to be limited only by the following claims.

What is claimed is:

1. A display comprising:
   a pair of substrates defining a cavity therebetween;
   a liquid contained within the cavity, the liquid having a coefficient of thermal expansion that is different from the cavity; and
   means for minimizing a volume differential between the liquid and the cavity caused by a change in temperature of the display so as to prevent the formation of bubbles within the liquid, the minimizing means comprising a diaphragm and means for actuating the diaphragm in response to a change in the temperature of the display.

2. A display according to claim 1, wherein the minimizing means is operable to deliver a second liquid to the cavity and receive the liquid from the cavity in response to changes in the temperature of the display.

3. A display according to claim 2, wherein the minimizing means comprises a reservoir in fluidic communication with the cavity.

4. A display according to claim 2, wherein the diaphragm is in fluidic communication with the cavity.

5. A display according to claim 2, wherein the minimizing means delivers the second liquid to the cavity in response to a drop in the temperature of the display and receives the liquid from the cavity in response to a rise in the temperature of the display.

6. A display according to claim 1, wherein the diaphragm defines an edge of the display so that the cavity has a variable volume.

7. A display according to claim 1, wherein the liquid is a liquid crystal material.

8. A display according to claim 1, further comprising spacers between and contacting each of the substrates so as to space the substrates apart.

9. A display comprising:
   a pair of substrates defining a cavity therebetween;
   a liquid contained within the cavity, the liquid having a coefficient of thermal expansion that is different from the cavity;
   spacers between and contacting each of the substrates so as to space the substrates apart, wherein the spacers have a coefficient of thermal expansion that is different from the liquid; and
   means for minimizing a volume differential between the liquid and the cavity caused by a change in temperature of the display so as to prevent the formation of bubbles within the liquid.

10. A computer display comprising:

a pair of flat substrates defining a cavity therebetween;

a first liquid crystal material contained within the cavity, the first liquid crystal material having a coefficient of thermal expansion that is different than the cavity;

spacers between and contacting each of the substrates so as to space the substrates apart, the spacers having a coefficient of thermal expansion that is less than the first liquid crystal material; and means for delivering a second liquid crystal material to the cavity in response to a drop in the temperature of the display and receiving the first liquid crystal material from the cavity in response to a rise in the temperature of the display.

11. A computer display according to claim 10, wherein the delivering and receiving means comprises a diaphragm and means for actuating the diaphragm in response to a change in the temperature of the display.

12. A computer display according to claim 11, wherein the actuating means is a bimorph spring.

13. A computer display according to claim 11, wherein the actuating means comprises an actuator associated with the diaphragm and a temperature sensor that generates a signal used to control the actuator.

14. A computer display according to claim 10, wherein the delivering and receiving means comprises a reservoir in fluidic communication with the cavity.

15. A computer display according to claim 14, wherein the reservoir is a tube having one end thereof fluidically connected to the cavity.

16. A computer display according to claim 15, wherein the tube has a diaphragm, the delivering and receiving means further comprising means for actuating the diaphragm in response to a change in the temperature of the display.

17. A computer display according to claim 14, wherein the reservoir is a channel defined along an edge of the display.

18. A computer display according to claim 17, wherein a portion of the channel is defined by a diaphragm, the delivering and receiving means further comprising means for actuating the diaphragm in response to a change in the temperature of the display.

* * * * *